United States Patent
Shirakawa et al.

(10) Patent No.: US 11,415,021 B2
(45) Date of Patent: Aug. 16, 2022

(54) BEARING DEVICE AND TURBOCHARGER

(71) Applicant: MITSUBISHI HEAVY INDUSTRIES MARINE MACHINERY & EQUIPMENT CO., LTD., Nagasaki (JP)

(72) Inventors: Taiyo Shirakawa, Nagasaki (JP); Yasuhiro Wada, Nagasaki (JP); Yukihiro Iwasa, Nagasaki (JP); Tetsuya Matsuo, Nagasaki (JP)

(73) Assignee: MITSUBISHI HEAVY INDUSTRIES MARINE MACHINERY & EQUIPMENT CO., LTD., Nagasaki (JP)

(*) Notice: Subject to any disclaimer, the term of this patent is extended or adjusted under 35 U.S.C. 154(b) by 0 days.

(21) Appl. No.: 17/257,118

(22) PCT Filed: Jul. 22, 2019

(86) PCT No.: PCT/JP2019/028574
§ 371 (c)(1),
(2) Date: Dec. 30, 2020

(87) PCT Pub. No.: WO2020/026863
PCT Pub. Date: Feb. 6, 2020

(65) Prior Publication Data
US 2021/0231029 A1    Jul. 29, 2021

(30) Foreign Application Priority Data
Jul. 30, 2018    (JP) .............................. JP2018-142230

(51) Int. Cl.
*F01D 25/16*    (2006.01)
*F01D 25/18*    (2006.01)

(52) U.S. Cl.
CPC ........... *F01D 25/162* (2013.01); *F01D 25/18* (2013.01); *F05D 2220/40* (2013.01); *F05D 2240/54* (2013.01); *F05D 2260/98* (2013.01)

(58) Field of Classification Search
CPC .... F01D 2220/40; F01D 25/162; F01D 25/18; F05D 2240/54; F05D 2260/98; F02C 6/12
(Continued)

(56) References Cited

U.S. PATENT DOCUMENTS 3,811,741 A * 5/1974 McInerney ............. F16C 27/02
384/291
4,240,678 A * 12/1980 Sarle ....................... F16C 33/10
384/369
(Continued)

FOREIGN PATENT DOCUMENTS

| JP | S55-112418 A | 8/1980 | |
| JP | 63088318 A * | 4/1988 | .............. F16C 17/18 |

(Continued)

OTHER PUBLICATIONS

International Search report dated Sep. 24, 2019, issued in counterpart Application No. PCT/JP2019/028574, with English Translation. (13 pages).

(Continued)

*Primary Examiner* — Devon C Kramer
*Assistant Examiner* — Kelsey L Stanek
(74) *Attorney, Agent, or Firm* — WHDA, LLP

(57) ABSTRACT

A bearing device includes: a bearing housing; a floating metal having a cylindrical shape and disposed in a housing hole of the bearing housing and in which a rotational shaft is inserted; and a positioning pin for positioning the floating metal with respect to the bearing housing, the positioning pin being disposed along a radial direction of the rotational shaft. The positioning pin includes a first oil supply hole (Continued)

formed so as to penetrate the positioning pin and communicating with a first space between an inner peripheral surface of the floating metal and an outer peripheral surface of the rotational shaft, and a second oil supply hole formed inside the positioning pin so as to connect a second space to the first oil supply hole, the second space being disposed between an outer peripheral surface of the floating metal and an inner peripheral surface of the housing hole.

13 Claims, 3 Drawing Sheets

(58) Field of Classification Search
USPC .......................................................... 415/229
See application file for complete search history.

(56) References Cited

U.S. PATENT DOCUMENTS

| 7,753,591 | B2 | 7/2010 | Petitjean et al. | |
|---|---|---|---|---|
| 2018/0051744 | A1* | 2/2018 | Ammon | .................... F02C 7/06 |
| 2018/0179954 | A1 | 6/2018 | Klusacek et al. | |

FOREIGN PATENT DOCUMENTS

| JP | S63-088318 | A | | 4/1988 | | |
|---|---|---|---|---|---|---|
| JP | 2006-029148 | A | | 2/2006 | | |
| JP | 2006029148 | A | * | 2/2006 | .......... | F16C 33/1045 |
| JP | 2007-285252 | A | | 11/2007 | | |
| JP | 2007285252 | A | * | 11/2007 | ............ | F16C 37/002 |
| JP | 2014-009701 | A | | 1/2014 | | |
| JP | 2014009701 | A | * | 1/2014 | | |
| JP | 2014-080890 | A | | 5/2014 | | |
| JP | 2014080890 | A | * | 5/2014 | .......... | F16C 33/1045 |
| JP | 5977118 | B2 | | 8/2016 | | |

OTHER PUBLICATIONS

Notification Concerning Transmittal of International Preliminary Report on Patentability (Forms PCT/IB/326) issued in counterpart International Application No. PCT/JP2019/028574 dated Feb. 11, 2021 with Forms PCT/IB/373, PCT/IB/338 and PCT/ISA/237. (19 pages).

* cited by examiner

BEARING DEVICE AND TURBOCHARGER

TECHNICAL FIELD

The present invention relates to a bearing device and a turbocharger.

BACKGROUND

As a bearing device that rotatably supports a rotational shaft, a floating bearing using a cylindrical floating metal through which the rotational shaft is inserted may be used. In such a floating bearing device, oil is supplied to a gap between the inner peripheral surface of the floating metal and the rotational shaft to form an oil film, and the rotational shaft is rotatably supported by the oil film.

Patent Document 1 discloses a turbocharger using such a floating bearing device. This turbocharger includes a bearing device including a floating metal that rotatably supports a rotational shaft to which a turbine blade driven by exhaust gas and a compressor blade for compressing air are fixed. In this bearing device, an anti-rotation pin fixed to a housing is fitted into an anti-rotation hole provided in the floating metal to prevent the floating metal from rotating with the rotational shaft. Further, oil is supplied to an oil pool formed between the inner peripheral surface of the floating metal and the rotational shaft through a hole provided in the anti-rotation pin.

CITATION LIST

Patent Literature

Patent Document 1: JP5977118B

SUMMARY

Problems to be Solved

In the floating bearing device, an oil film may also be formed between the outer peripheral surface of the floating metal and the bearing housing. This oil film can be expected to have an effect of attenuating the vibration of the rotor. Further, for downsizing the bearing device and a rotating machine using the bearing device, it is desired to form the above oil film with a simple device configuration.

In this regard, the bearing device of Patent Document 1 does not disclose the supply of oil between the outer peripheral surface of the floating metal and the bearing housing, and the configuration for supplying the oil.

In view of the above, an object of at least one embodiment of the present invention is to provide a bearing device and a turbocharger whereby it is possible to simplify an oil supply passage for supplying oil to the inner peripheral surface and the outer peripheral surface of the floating metal.

Solution to the Problems (1) A bearing device according to at least one embodiment of the present invention comprises: a bearing housing; a floating metal having a cylindrical shape and disposed in a housing hole of the bearing housing and in which a rotational shaft is inserted; and a positioning pin, disposed along a radial direction of the rotational shaft, for positioning the floating metal with respect to the bearing housing. The positioning pin includes a first oil supply hole formed so as to penetrate the positioning pin and communicating with a first space between an inner peripheral surface of the floating metal and an outer peripheral surface of the rotational shaft, and a second oil supply hole formed inside the positioning pin so as to connect a second space between an outer peripheral surface of the floating metal and an inner peripheral surface of the housing hole to the first oil supply hole.

With the above configuration (1), since the positioning pin for positioning the floating metal has the first oil supply hole communicating with the first space and the second oil supply hole connecting the second space to the first oil supply hole, oil can be supplied to the inner peripheral surface (first space) and the outer peripheral surface (second space) of the floating metal with a simple configuration in which the first oil supply hole and the second oil supply hole are provided in the positioning pin. As a result, it is possible to simplify the oil supply passage for forming an oil film in the bearing device and downsize the bearing device.

Further, since the positioning pin is relatively easy to replace, the positioning pin installed in the bearing device can be replaced to a positioning pin having the first oil supply hole or the second oil supply hole with a different diameter from that of the first oil supply hole or the second oil supply hole of the previous positioning pin. Thus, the diameter of the first oil supply hole and/or the second oil supply hole in the bearing device can be easily changed. As a result, it is possible to easily adjust the amount of oil supplied to the bearing device via the first oil supply hole and the second oil supply hole.

(2) In some embodiments, in the above configuration (1), the bearing device further comprises an annular oil passage disposed on the bearing housing so as to face the outer peripheral surface of the floating metal on an outer peripheral side of the floating metal. The second oil supply hole communicates with the second space via the annular oil passage.

With the above configuration (2), since the bearing housing has the annular oil passage which faces the outer peripheral surface of the floating metal, oil can be easily supplied to the outer peripheral surface of the floating metal over the entire circumference.

As a result, oil can be more smoothly supplied from the second space, and an oil film can be more reliably formed on the outer peripheral side of the floating metal.

(3) In some embodiments, in the above configuration (1) or (2), the first oil supply hole includes a radial hole portion extending along the radial direction, and the second oil supply hole is connected to the radial hole portion.

With the above configuration (3), since the second oil supply hole is connected to the radial hole portion of the first oil supply hole, oil supplied to the first oil supply hole can be smoothly supplied to the second space via the second oil supply hole.

(4) In some embodiments, in any one of the above configurations (1) to (3), the second oil supply hole is formed along a circumferential direction of the rotational shaft.

With the above configuration (4), since the second oil supply hole is formed along the circumferential direction, oil can be smoothly supplied to the annular oil passage or the second space formed around the floating metal via the second oil supply hole.

(5) In some embodiments, in any one of the above configurations (1) to (4), the bearing housing has a radial hole disposed along the radial direction so as to be connected to the housing hole. The floating metal has a recess recessed inward in the radial direction from the outer peripheral surface of the floating metal. The positioning pin includes a base end portion engaged with the radial hole, and a tip end portion loosely fitted in the recess.

With the above configuration (5), the base end portion of the positioning pin is engaged with the radial hole of the bearing housing, and the tip end portion of the positioning pin is loosely fitted in the recess of the floating metal. As a result, the floating metal can be reliably positioned with respect to the bearing housing while allowing a slight movement of the floating metal with respect to the bearing housing.

(6) In some embodiments, in the above configuration (5), the bearing device further comprises a plug inserted in the radial hole and located outward of the positioning pin in the radial direction, and oil is supplied to the first oil supply hole via a space formed between the plug and the positioning pin in the radial direction.

With the above configuration (6), the space between the plug and the positioning pin is used as a passage for oil supply, and oil is supplied to the first oil supply hole via this passage. Further, when the plug is not attached to the radial hole of the bearing housing, the positioning pin can be easily attached and detached through the radial hole. Therefore, the maintenance of the bearing device can be facilitated.

(7) In some embodiments, in the above configuration (5) or (6), the floating metal has a communication hole formed so as to extend along the radial direction inside the floating metal and open at both ends to a bottom surface of the recess and the inner peripheral surface of the floating metal, respectively. The first oil supply hole is disposed so as to pass through the tip end portion and penetrate the positioning pin along the radial direction. The first oil supply hole communicates with the first space via the communication hole.

With the above configuration (7), since the floating metal has the communication hole opening to the bottom surface of the recess into which the tip end portion of the positioning pin is loosely fitted and to the inner peripheral surface of the floating metal, oil can be smoothly supplied from the first oil supply hole to the first space via the communication hole. Further, with the above configuration (7), oil can be supplied to the first space and the second space via the space between the plug and the positioning pin, the first oil supply hole and the second oil supply hole formed in the positioning pin, and the communication hole formed in the floating metal. In other words, since the oil supply passage is formed by using components such as the plug and the positioning pin which are relatively easy to replace, it is possible to easily adjust the amount of oil by replacing these components.

(8) In some embodiments, in any one of the above configurations (1) to (7), the bearing device further comprises a locking portion for locking the positioning pin to the bearing housing.

With the above configuration (8), since the positioning pin is locked to the bearing housing by the locking portion, the floating metal can be more reliably positioned with respect to the bearing housing.

(9) In some embodiments, in the above configuration (8), the locking portion includes a male thread formed on the positioning pin at least partially in an axial direction of the positioning pin, and a female thread formed on the bearing housing and mated with the male thread.

With the above configuration (9), by mating the male thread formed on the positioning pin with the female thread formed on the bearing housing, the positioning pin can be reliably locked to the bearing housing.

(10) In some embodiments, in any one of the above configurations (1) to (9), the bearing device further comprises at least one thrust collar disposed adjacent to the floating metal in an axial direction of the rotational shaft and configured to rotate together with the rotational shaft, and oil is supplied between an end surface of the floating metal in the axial direction of the rotational shaft and the at least one thrust collar via the first space.

With the above configuration (10), since thrust load of the rotating machine can be supported via oil supplied between the end surface of the floating metal in the axial direction and the thrust collar, the bearing device including the floating metal can function as both the radial bearing and the thrust bearing. Thus, it is possible to downsize the bearing device of the rotating machine.

(11) In some embodiments, in any one of the above configurations (1) to (10), the bearing device comprises: an oil inlet formed on an outer surface of the bearing housing and disposed in a region opposite to a positioning pin with respect to the rotational shaft; and a supply passage formed so as to extend along an extending direction of the positioning pin inside the bearing housing. The supply passage is a passage for supplying oil from the oil inlet to the first oil supply hole. The supply passage is disposed at a position shifted from the positioning pin in an axial direction of the rotational shaft.

With the above configuration (11), since the supply passage for supplying oil to the first oil supply hole from the oil inlet in a region opposite to the positioning pin with respect to the rotational shaft is disposed so as to be shifted from the positioning pin in the axial direction, while avoiding interference between the supply passage and oil passages (e.g., rotational shaft, floating metal, or annular oil passage described above) or components positioned in the vicinity of the positioning pin in the axial direction, oil can be smoothly supplied to the first oil supply hole with a reduced length of the oil supply passage from the oil inlet to the first oil supply hole.

(12) A turbocharger according to at least one embodiment of the present invention comprises: the bearing device according to any one of the above (1) to (11); a rotational shaft rotatably supported by the bearing device; and a compressor impeller and a turbine impeller disposed on the rotational shaft.

With the above configuration (12), since the positioning pin for positioning the floating metal has the first oil supply hole communicating with the first space and the second oil supply hole connecting the second space to the first oil supply hole, oil can be supplied to the inner peripheral surface (first space) and the outer peripheral surface (second space) of the floating metal with a simple configuration in which the first oil supply hole and the second oil supply hole are provided in the positioning pin. As a result, it is possible to simplify the oil supply passage for forming an oil film in the bearing device and downsize the bearing device and the turbocharger.

Further, since the positioning pin is relatively easy to replace, the positioning pin installed in the bearing device can be replaced to a positioning pin having the first oil supply hole or the second oil supply hole with a different diameter from that of the first oil supply hole or the second oil supply hole of the previous positioning pin. Thus, the diameter of the first oil supply hole and/or the second oil supply hole in the bearing device can be easily changed. As a result, it is possible to easily adjust the amount of oil supplied to the bearing device via the first oil supply hole and the second oil supply hole.

Advantageous Effects

At least one embodiment of the present invention provides a bearing device and a turbocharger whereby it is possible to simplify an oil supply passage for supplying oil to the inner peripheral surface and the outer peripheral surface of the floating metal.

DETAILED DESCRIPTION

Embodiments of the present invention will now be described in detail with reference to the accompanying drawings. It is intended, however, that unless particularly identified, dimensions, materials, shapes, relative positions, and the like of components described in the embodiments shall be interpreted as illustrative only and not intended to limit the scope of the present invention.

Figure 1:
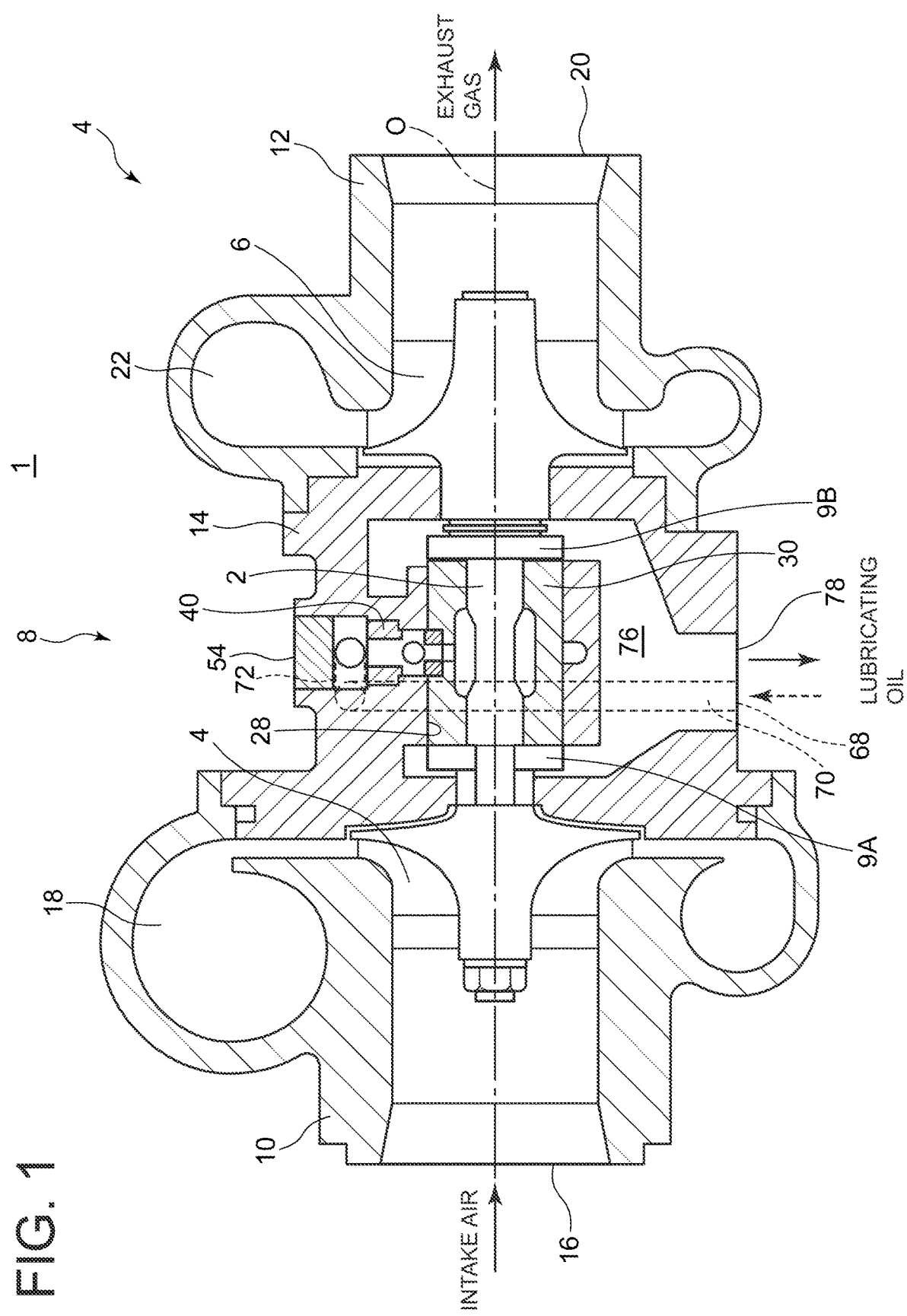
FIG. 1 is a schematic cross-sectional view of a turbocharger according to an embodiment.

First, with reference to FIG. 1, a turbocharger including a bearing device according to an embodiment will be described. FIG. 1 is a schematic cross-sectional view of a turbocharger according to an embodiment. As shown in this figure, the turbocharger 1 according to an embodiment includes a rotational shaft 2, a compressor impeller 4 disposed at one end portion of the rotational shaft 2, a turbine impeller 6 disposed at the other end portion of the rotational shaft 2, and a bearing device 8 rotatably supporting the rotational shaft 2. The bearing device 8 is positioned between the compressor impeller 4 and the turbine impeller 6 in the axial direction of the rotational shaft 2.

Further, the turbocharger 1 includes a compressor housing 10 surrounding the compressor impeller 4, a turbine housing 12 surrounding the turbine impeller 6, and a bearing housing 14 positioned between the compressor housing 10 and the turbine housing 12 in the axial direction of the rotational shaft 2. The compressor housing 10 and the bearing housing 14, as well as the turbine housing 12 and the bearing housing 14, may be fastened with a bolt (not shown).

The compressor housing 10 has an air inlet that opens axially outward at one end portion of the turbocharger 1 in the axial direction, and forms an annular passage 18 disposed radially outward of the compressor impeller 4.

The turbine housing 12 has an exhaust gas outlet 20 that opens axially outward at the other end portion of the turbocharger 1 in the axial direction, and forms an annular passage 22 disposed radially outward of the turbine impeller 6.

The turbocharger 1 having the above-described configuration is operated as follows, for example.

The air flows into the compressor impeller 4 via the air inlet 16, and the air is compressed by the compressor impeller 4 rotating with the rotational shaft 2. The compressed air thus generated is temporarily discharged from the turbocharger 1 via the annular passage 18 formed radially outward of the compressor impeller 4 and supplied to a combustion engine (not shown).

In the combustion engine, fuel is combusted with the compressed air to produce combustion gas by the combustion reaction. The combustion gas flows into the turbine impeller 6 via the annular passage 22 formed radially outward of the turbine impeller 6 as exhaust gas discharged from the combustion engine. This inflow exhaust gas imparts rotational energy to the turbine impeller 6 and drives the rotational shaft 2. The exhaust gas used in the turbine is discharged from the turbocharger 1 via the exhaust gas outlet 20.

Figure 2:
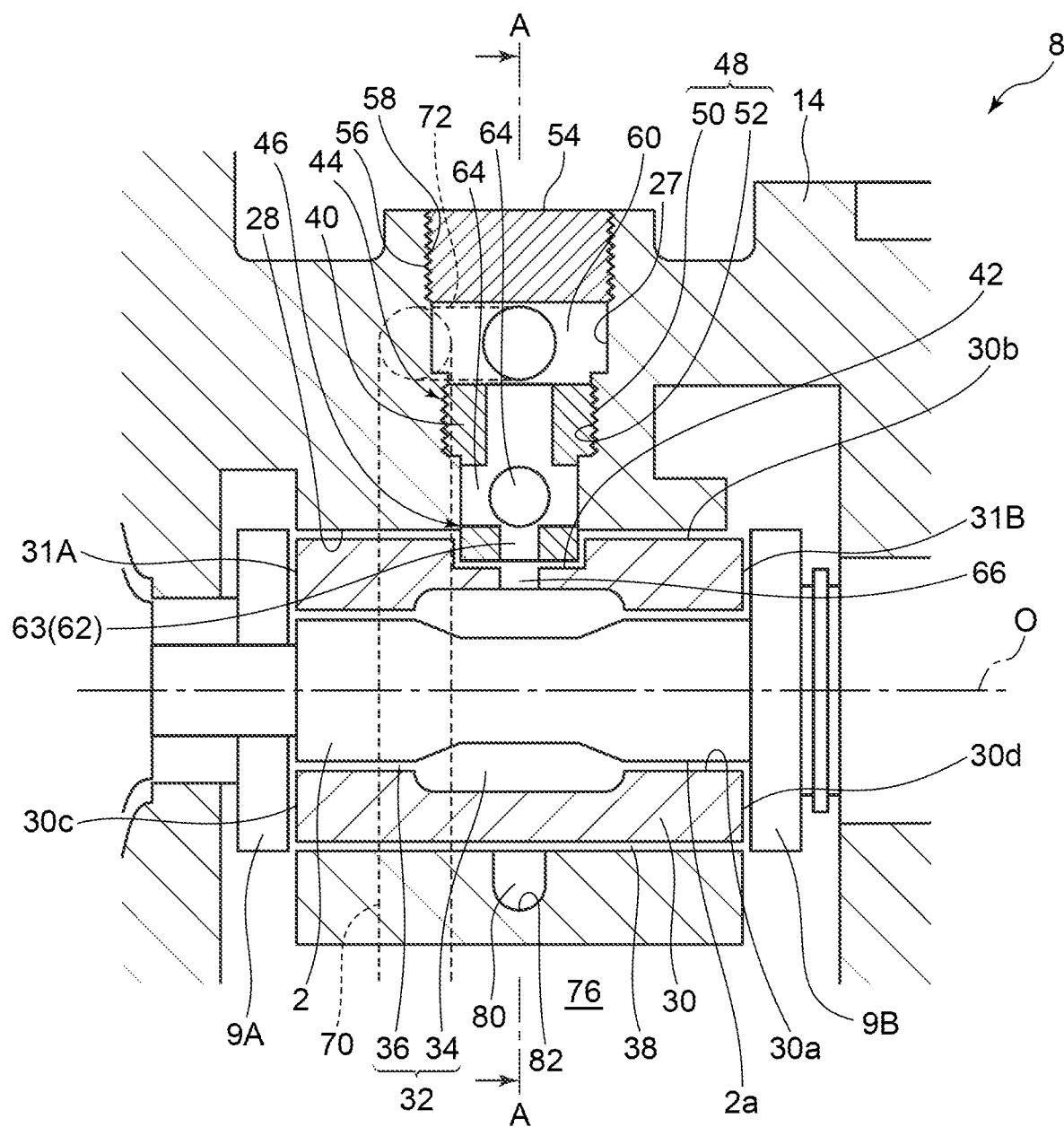
FIG. 2 is a partial enlarged view of a bearing device of the turbocharger shown in FIG. 1.
Figure 3:
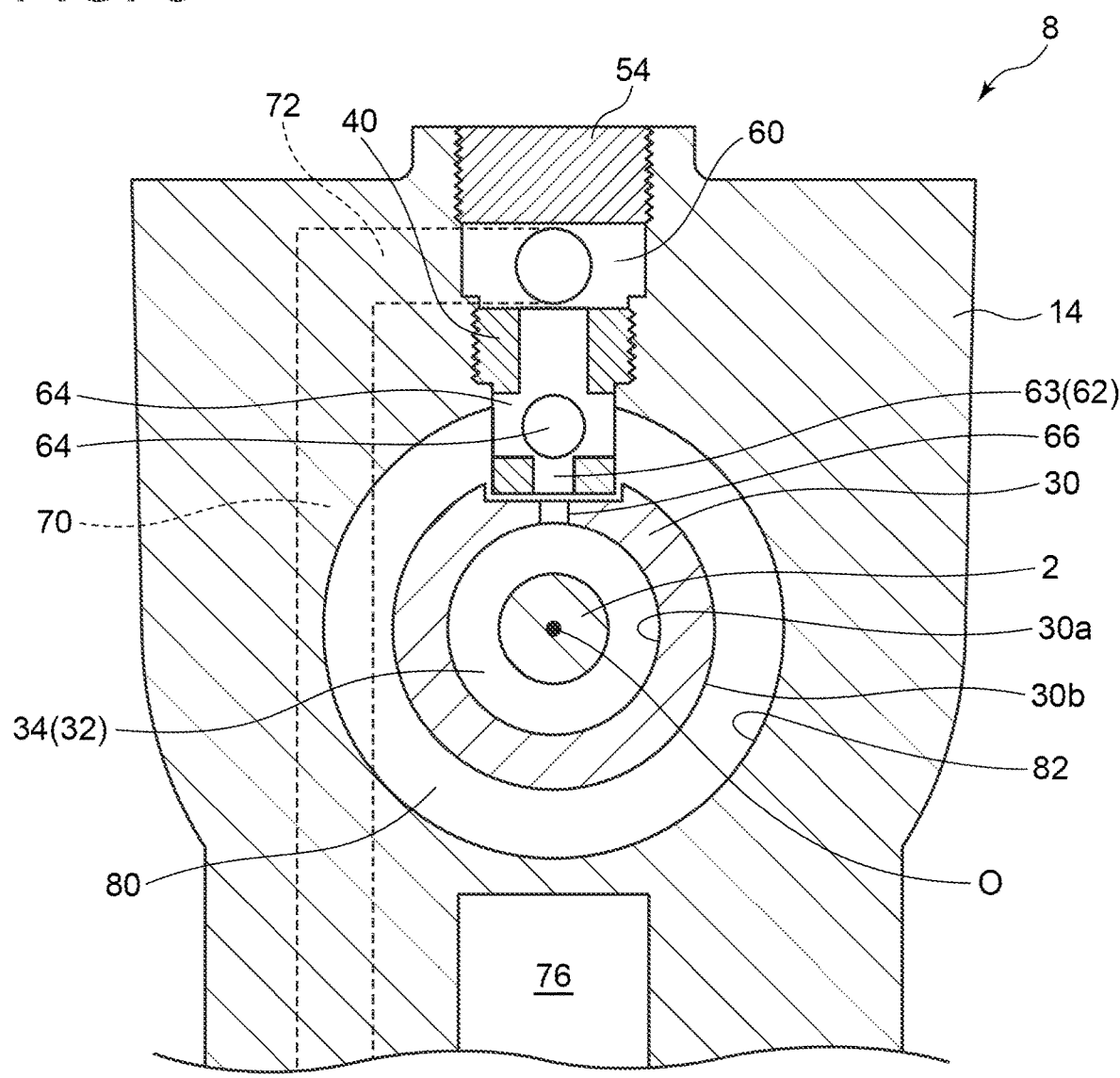
FIG. 3 is a cross-sectional view taken along line A-A in FIG. 2.

Next, with reference to FIGS. 1 to 3, the bearing device 8 according to some embodiments will be described in more detail. FIG. 2 is a partial enlarged view of the bearing device 8 of the turbocharger 1 shown in FIG. 1. FIG. 3 is a cross-sectional view taken along line A-A in FIG. 2.

As shown in FIGS. 1 and 2, the bearing device 8 includes the bearing housing 14 described above, and a cylindrical floating metal 30 disposed in the housing hole 28 of the bearing housing 14 and through which the rotational shaft 2 is inserted. The floating metal 30 is positioned between the compressor impeller 4 and the turbine impeller 6 in the axial direction of the rotational shaft 2.

The bearing device 8 further includes thrust collars 9A, 9B disposed on the rotational shaft 2. The thrust collars 9A, 9B are disposed adjacent to the floating metal 30 in the axial direction of the rotational shaft 2 and configured to rotate together with the rotational shaft 2 around the rotational axis O.

The thrust collar 9A, 9B may be integrally formed with the rotational shaft 2, or the thrust collar 9A, 9B separately formed from the rotational shaft 2 may be fixed to the rotational shaft 2.

A first space 32 is formed between an inner peripheral surface 30a of the floating metal 30 and an outer peripheral surface 2a of the rotational shaft 2. The first space 32 includes an oil reservoir portion 34 disposed in the vicinity of the center in the axial direction of the floating metal 30, and a gap portion 36 disposed on both sides of the oil reservoir portion 34 in the axial direction of the floating metal 30 so as to communicate with the oil reservoir portion 34.

A second space 38 (gap) is formed between an outer peripheral surface 30b of the floating metal 30 and an inner wall surface of the housing hole 28.

Further, slight axial gaps or spaces 31A, 31B are formed between one end surface 30c of the floating metal 30 in the axial direction of the rotational shaft 2 and the thrust collar 9A and between the other end surface 30d of the floating metal 30 in the axial direction and the thrust collar 9B, respectively.

A second space 38 (gap) is formed between an outer peripheral surface 30b of the floating metal 30 and an inner wall surface of the housing hole 28.

Further, slight axial gaps 31A, 31B are formed between one end surface 30c of the floating metal 30 in the axial direction of the rotational shaft 2 and the thrust collar 9A and between the other end surface 30d of the floating metal 30 in the axial direction and the thrust collar 9B, respectively.

The floating metal 30 functions as a semi-floating bearing when the first space 32 (oil reservoir portion 34 and gap portion 36), the second space 38, and the axial spaces 31A, 31B are filled with lubricating oil.

Specifically, the floating metal 30 is supported to the bearing housing 14 via an oil film formed in the second space 38 between the outer peripheral surface 30b of the floating metal 30 and the inner wall surface of the housing hole 28, and the radial load of the rotational shaft 2 is borne by an oil film formed in the first space 32 between the inner peripheral surface 30a of the floating metal 30 and the rotational shaft 2. Further, the thrust load of the rotational shaft 2 is borne by lubricating oil supplied between the end surfaces 30c, 30d of the floating metal 30 and the thrust collars 9A, 9B.

The bearing device 8 includes a positioning pin 40 disposed along the radial direction of the rotational shaft 2 (hereinafter, also simply referred to as "radial direction") for positioning the floating metal 30 with respect to the bearing housing 14.

The positioning pin 40 is disposed at the central position of the floating metal 30 in the axial direction of the rotational shaft 2. The positioning pin 40 may be displaced from the central position of the floating metal 30 in the axial direction of the rotational shaft 2.

The positioning pin 40 is engaged with a radial hole 27 disposed on the bearing housing 14 and fitted in a recess 42 disposed on the floating metal 30 with a gap (i.e., loosely fitted).

The radial hole 27 is disposed on the bearing housing 14 along the radial direction so as to be connected to the housing hole 28 of the bearing housing 14. The recess 42 is disposed so as to be recessed inward in the radial direction from the outer peripheral surface 30b of the floating metal 30. Further, the positioning pin 40 includes a base end portion 44 engaged with the radial hole 27 of the bearing housing 14 and a tip end portion 46 loosely fitted in the recess 42 of the floating metal 30. That is, a gap is formed between the tip end portion 46 of the positioning pin 40 and the recess 42 of the floating metal 30.

Although not particularly illustrated, in another embodiment, the floating metal 30 may be provided with, instead of the recess 42, a through hole opening at one end to the inner peripheral surface 30a of the floating metal 30 and at the other end to the outer peripheral surface 30b. Further, the positioning pin 40 may be engaged with the radial hole 27 disposed on the bearing housing 14, and may pass through the through hole with a gap from the inner wall surface of the through hole provided in the floating metal 30.

In this case, the positioning pin 40 includes a base end portion engaged with the radial hole 27 of the bearing housing 14 and a tip end portion passing through the through hole of the floating metal 30.

Further, the positioning pin 40 may be locked to the bearing housing 14 by a locking portion 48. For example, as shown in FIG. 2, a male thread 50 may be formed on the positioning pin 40 at least partially in the axial direction of the positioning pin 40, and a female thread 52 may be formed on the radial hole 27 of the bearing housing 14. By mating the male thread 50 of the positioning pin 40 with the female thread 52 of the bearing housing 14, the positioning pin 40 is locked to the bearing housing 14. In other words, the locking portion 48 includes the male thread 50 of the positioning pin 40 and the female thread 52 of the bearing housing 14.

Thus, since the positioning pin 40 is fixed to the bearing housing 14 by the locking portion 48 and loosely fitted in the floating metal 30, it allows the floating metal 30 to move slightly while preventing the floating metal 30 from rotating together with the rotational shaft 2. Accordingly, the floating metal 30 can exhibit a function as the semi-floating bearing.

In the radial hole 27 of the bearing housing 14, a plug 54 is inserted on the radially outer side of the positioning pin 40. The outer peripheral surface of the plug 54 has a male thread 56, which is mated with a female thread 58 formed on the radial hole 27 to fix the position of the plug 54 with respect to the bearing housing 14.

In the radial direction, a space 60 is formed between the plug 54 and the positioning pin 40.

The positioning pin 40 has a first oil supply hole 62 and a second oil supply hole 64. The first oil supply hole 62 is formed so as to penetrate the positioning pin 40, and communicates with the first space 32 via a communication hole 66 of the floating metal 30 described later. The second oil supply hole 64 is formed inside the positioning pin 40 so that the second space 38 communicates with the first oil supply hole 62 therethrough.

The first oil supply hole 62 may have a radial hole portion extending along the radial direction. This radial hole portion may extend over the entire region of the first oil supply hole 62 in the radial direction or may partially extend in the radial direction. Alternatively, the first oil supply hole 62 may have an inclined portion extending so as to be inclined with respect to the radial direction, or may have both the radial hole portion and the inclined portion.

In the illustrated embodiment, the first oil supply hole 62 includes a radial hole portion 63 extending along the radial direction, and the second oil supply hole 64 is connected to the radial hole portion 63.

In the illustrated embodiment, the first oil supply hole 62 includes a radial hole portion 63 disposed so as to pass through the tip end portion 46 of the positioning pin 40 and penetrate the positioning pin 40 along the radial direction.

The first oil supply hole 62 does not necessarily have to be a linear hole, and may be provided, for example, at least partially so as to be inclined with respect to the radial direction. One end or both ends of the first oil supply hole 62 may open to the side surface of the positioning pin 40.

The second oil supply hole 64 may extend along the circumferential direction of the rotational shaft 2.

Further, a plurality of the second oil supply holes 64 may be provided radially around the axis of the positioning pin 40. In the illustrated embodiment, four second oil supply holes 64 are provided radially around the axis of the positioning pin 40.

The floating metal 30 has a communication hole 66 formed so as to extend along the radial direction inside the floating metal 30. The communication hole 66 has one end opening to a bottom surface of the recess 42 and the other end opening to the inner peripheral surface 30a of the floating metal 30.

The first oil supply hole 62 communicates with the first space 32 via the communication hole 66.

Via the space 60, the first oil supply hole 62, the second oil supply hole 64, and the communication hole 66, lubricating oil is supplied to the first space 32 and the second space 38. Further, via the first space 32, lubricating oil is supplied between the end surfaces 30c, 30d of the floating metal 30 and the thrust collars 9A, 9B.

The bearing housing 14 has an annular oil passage 80 facing the outer peripheral surface 30b of the floating metal 30 on the outer peripheral side of the floating metal 30. The annular oil passage 80 is formed by a circumferential groove 82 disposed on the inner peripheral surface of the housing hole 28 of the bearing housing 14. As shown in FIG. 3, the second oil supply hole 64 communicates with the second space 38 via the annular oil passage 80.

The annular oil passage 80 may be at a position overlapping the positioning pin 40 in the axial direction of the rotational shaft 2.

In some embodiments, an oil inlet 68 for introducing lubricating oil to the bearing housing 14 is formed on the outer surface of the bearing housing 14 in a region opposite to the positioning pin 40 with respect to the rotational shaft 2. In the illustrated embodiment, the positioning pin 40 is disposed above the rotational shaft 2, and the oil inlet 68 is disposed in a lower region of the bearing housing 14, The lubricating oil from the oil inlet 68 is introduced into the space 60 via a supply passage 70 formed inside the bearing housing 14. That is, the supply passage 70 is a passage for supplying oil from the oil inlet 68 to the first oil supply hole 62.

The supply passage 70 extends along the extending direction of the positioning pin 40 (in the illustrated embodiment, vertical direction). The supply passage 70 includes a connection passage 72 connecting the supply passage 70 to the space 60. In the illustrated embodiment, the supply passage 70 extends along the horizontal direction.

Further, the supply passage 70 is disposed at a position shifted from the positioning pin 40 in the axial direction of the rotational shaft 2. The connection passage 72 extends so as to be inclined with respect to the axial direction of the rotational shaft 2 in a plan view.

The lubricating oil leaking from the first space 32, the second space 38, or the like is discharged from an oil outlet 78 through an oil discharge space 76 positioned below the floating metal 30.

In the bearing device 8 according to the above-described embodiments, the positioning pin 40 for positioning the floating metal 30 has the first oil supply hole 62 communicating with the first space 32 and the second oil supply hole 64 connecting the second space 38 to the first oil supply hole 62. Thus, oil can be supplied to the inner peripheral surface 30a (first space 32) and the outer peripheral surface 30b (second space 38) of the floating metal 30 with a simple configuration in which the first oil supply hole 62 and the second oil supply hole 64 are provided in the positioning pin 40. As a result, it is possible to simplify the oil supply passage for forming an oil film in the bearing device 8 and downsize the bearing device 8.

Further, since the positioning pin 40 is relatively easy to replace, the positioning pin 40 installed in the bearing device 8 can be replaced to a positioning pin 40 having the first oil supply hole or the second oil supply hole with a different diameter from that of the first oil supply hole 62 or the second oil supply hole 64 of the previous positioning pin 40. Thus, the diameter of the first oil supply hole 62 and/or the second oil supply hole 64 in the bearing device 8 can be easily changed. As a result, it is possible to easily adjust the amount of oil supplied to the bearing device 8 via the first oil supply hole 62 and the second oil supply hole 64.

Further, in the above-described embodiment, since the bearing housing 14 has the annular oil passage 80 which faces the outer peripheral surface 30b of the floating metal 30, oil can be easily supplied to the outer peripheral surface 30b of the floating metal 30 over the entire circumference. As a result, oil can be more smoothly supplied from the second space 38, and an oil film can be more reliably formed on the outer peripheral side of the floating metal 30.

Further, in the above-described embodiment, since the second oil supply hole 64 is connected to the radial hole portion 63 of the first oil supply hole 62, oil supplied to the first oil supply hole 62 can be smoothly supplied to the second space 38 via the second oil supply hole 64.

Further, in the above-described embodiment, since a plurality of second oil supply holes 64 is provided, at least any of the plurality of second oil supply holes 64 may communicate with the circumferential groove 82. Accordingly, for example, even if the orientation of the positioning pin 40 is changed, it is possible prevent all of the second oil supply holes 64 from being closed by the inner wall surface of the radial hole 27 of the bearing housing 14, so that oil can be smoothly supplied to the second space 38.

Further, in the above-described embodiment, since the second oil supply hole 64 is formed along the circumferential direction, oil can be smoothly supplied to the annular oil passage 80 or the second space 38 formed around the floating metal 30 via the second oil supply hole 64.

When the second oil supply hole 64 is disposed so as to be connected to the annular oil passage 80, oil can be more smoothly supplied to the annular oil passage 80 and the second space 38.

Further, in the above-described embodiment, the base end portion 44 of the positioning pin 40 is engaged with the radial hole 27 of the bearing housing 14, and the tip end portion 46 of the positioning pin 40 is loosely fitted in the recess 42 of the floating metal 30. As a result, the floating metal 30 can be reliably positioned with respect to the bearing housing 14 while allowing a slight movement of the floating metal 30 with respect to the bearing housing 14.

In the above-described embodiment, the space 60 between the plug 54 and the positioning pin 40 is used as a passage for oil supply, and oil is supplied to the first oil supply hole 62 via this passage. Further, when the plug 54 is not attached to the radial hole 27 of the bearing housing 14, the positioning pin 40 can be easily attached and detached through the radial hole 27. Therefore, the maintenance of the bearing device 8 can be facilitated.

Further, in the above-described embodiment, since the floating metal 30 has the communication hole 66 opening to the bottom surface of the recess 42 into which the tip end portion 46 of the positioning pin 40 is loosely fitted and to the inner peripheral surface 30a of the floating metal 30, oil can be smoothly supplied from the first oil supply hole 62 to the first space 32 via the communication hole 66.

Further, in the above-described embodiment, oil can be supplied to the first space 32 and the second space 38 via the space 60 between the plug 54 and the positioning pin 40, the first oil supply hole 62 and the second oil supply hole 64 formed in the positioning pin 40, and the communication hole 66 formed in the floating metal 30. In other words, since the oil supply passage is formed by using components such as the plug 54 and the positioning pin 40 which are relatively easy to replace, it is possible to easily adjust the amount of oil by replacing these components.

Further, in the above-described embodiment, since the positioning pin 40 is locked to the bearing housing 14 by the locking portion 48, the floating metal 30 can be more reliably positioned with respect to the bearing housing 14.

In the above-described embodiment, as the locking portion 48, the male thread 50 formed on the positioning pin 40 and the female thread 52 formed on the bearing housing 14 are provided. By mating the male thread 50 with the female thread 52, the positioning pin 40 can be reliably locked to the bearing housing 14.

In some embodiments, the locking portion 48 may include a snap ring (not shown) for preventing the positioning pin 40 from coming out of the radial hole 27, and a groove (not shown) disposed on the inner wall surface of the radial hole 27 and receiving the snap ring. With the locking portion 48 using the snap ring, the positioning pin 40 can be reliably locked to the bearing housing 14.

Further, in the above-described embodiment, since thrust load of the turbocharger 1 (rotating machine) can be supported via oil supplied between the end surfaces 30c, 30d of the floating metal 30 in the axial direction and the thrust collars 9A, 9B, the bearing device 8 including the floating metal 30 can function as both the radial bearing and the thrust bearing. Thus, it is possible to downsize the bearing device of the turbocharger 1 (rotating machine).

Further, in the above-described embodiment, since the supply passage 70 for supplying oil to the first oil supply hole 62 from the oil inlet 68 in a region opposite to the positioning pin 40 with respect to the rotational shaft 2 is disposed so as to be displaced from the positioning pin 40 in the axial direction of the rotational shaft 2, while avoiding interference between the supply passage 70 and oil passages (e.g., rotational shaft 2, floating metal 30, oil outlet 78 or annular oil passage 80) or components positioned in the vicinity of the positioning pin 40 in the axial direction, oil can be smoothly supplied to the first oil supply hole 62 with a reduced length of the oil supply passage from the oil inlet 68 to the first oil supply hole 62.

Embodiments of the present invention were described in detail above, but the present invention is not limited thereto, and various amendments and modifications may be implemented.

Further, in the present specification, an expression of relative or absolute arrangement such as "in a direction", "along a direction", "parallel", "orthogonal", "centered", "concentric" and "coaxial" shall not be construed as indicating only the arrangement in a strict literal sense, but also includes a state where the arrangement is relatively displaced by a tolerance, or by an angle or a distance whereby it is possible to achieve the same function.

For instance, an expression of an equal state such as "same" "equal" and "uniform" shall not be construed as indicating only the state in which the feature is strictly equal, but also includes a state in which there is a tolerance or a difference that can still achieve the same function.

Further, for instance, an expression of a shape such as a rectangular shape or a cylindrical shape shall not be construed as only the geometrically strict shape, but also includes a shape with unevenness or chamfered corners within the range in which the same effect can be achieved.

On the other hand, an expression such as "comprise", "include", "have", "contain" and "constitute" are not intended to be exclusive of other components.

REFERENCE SIGNS LIST

1 Turbocharger
2 Rotational shaft
2a Outer peripheral surface
4 Compressor impeller
6 Turbine impeller
8 Bearing device
9A Thrust collar
9B Thrust collar
10 Compressor housing
12 Turbine housing
14 Bearing housing
16 Air inlet
18 Annular passage
20 Exhaust gas outlet
22 Annular passage
27 Radial hole
28 Housing hole
30 Floating metal
30a Inner peripheral surface
30b Outer peripheral surface
30c End surface
30d End surface
31A Axial space
31B Axial space
32 First space
34 Oil reservoir portion
36 Gap portion
38 Second space
40 Positioning pin
42 Recess
44 Base end portion
46 Tip end portion
48 Locking portion
50 Male thread
52 Female thread
54 Plug
56 Male thread
58 Female thread
60 Space
62 First oil supply hole
63 Radial hole portion
64 Second oil supply hole
66 Communication hole
68 Oil inlet
70 Supply passage
72 Connection passage
76 Oil discharge space
78 Oil outlet
80 Annular oil passage
82 Circumferential groove

The invention claimed is:

1. A bearing device, comprising:
a bearing housing;
a floating metal having a cylindrical shape and disposed in a housing hole of the bearing housing and in which a rotational shaft is inserted; and
a positioning pin for positioning the floating metal with respect to the bearing housing, the positioning pin being disposed along a radial direction of the rotational shaft,
wherein the positioning pin includes
a first oil supply hole formed so as to penetrate the positioning pin and communicating with a first space between an inner peripheral surface of the floating metal and an outer peripheral surface of the rotational shaft, and
a second oil supply hole formed inside the positioning pin so as to connect a second space to the first oil supply hole, the second space being disposed between an outer peripheral surface of the floating metal and an inner peripheral surface of the housing hole,
wherein the bearing housing further comprises a circumferential groove formed on an inner peripheral surface of the housing hole, the circumferential groove forming an annular oil passage disposed on the bearing housing so as to face the outer peripheral surface of the floating metal on an outer peripheral side of the floating metal, and
wherein the second oil supply hole of the positioning pin communicates with the second space via the annular oil passage formed by the circumferential groove.

2. The bearing device according to claim 1,
wherein the second oil supply hole opens to the annular oil passage.

3. The bearing device according to claim 1,
wherein the first oil supply hole includes a radial hole portion extending along the radial direction, and
wherein the second oil supply hole is connected to the radial hole portion.

4. The bearing device according to claim 1,
wherein the second oil supply hole is formed along a circumferential direction of the rotational shaft.

5. The bearing device according to claim 1,
wherein the bearing housing has a radial hole disposed along the radial direction so as to be connected to the housing hole,
wherein the floating metal has a recess recessed inward in the radial direction from the outer peripheral surface of the floating metal, and
wherein the positioning pin includes
a base end portion engaged with the radial hole, and
a tip end portion loosely fitted in the recess.

6. The bearing device according to claim 5, further comprising a plug inserted in the radial hole and located outward of the positioning pin in the radial direction,
wherein the bearing device is configured such that oil is supplied to the first oil supply hole via a space formed between the plug and the positioning pin in the radial direction.

7. The bearing device according to claim 5,
wherein the floating metal has a communication hole formed so as to extend along the radial direction inside the floating metal and open at both ends to a bottom surface of the recess and the inner peripheral surface of the floating metal, respectively,
wherein the first oil supply hole is disposed so as to pass through the tip end portion and penetrate the positioning pin along the radial direction, and
wherein the first oil supply hole communicates with the first space via the communication hole.

8. The bearing device according to claim 1, further comprising a locking portion for locking the positioning pin to the bearing housing.

9. The bearing device according to claim 8,
wherein the locking portion includes
a male thread formed on the positioning pin at least partially in an axial direction of the positioning pin, and
a female thread formed on the bearing housing and mated with the male thread.

10. The bearing device according to claim 1, further comprising at least one thrust collar disposed adjacent to the floating metal in an axial direction of the rotational shaft and configured to rotate together with the rotational shaft,
wherein the bearing device is configured such that oil is supplied between an end surface of the floating metal in the axial direction of the rotational shaft and the at least one thrust collar via the first space.

11. The bearing device according to claim 1, comprising:
an oil inlet formed on an outer surface of the bearing housing and disposed in a region opposite to the positioning pin with respect to the rotational shaft; and
a supply passage formed so as to extend along an extending direction of the positioning pin inside the bearing housing,
wherein the supply passage is a passage for supplying oil from the oil inlet to the first oil supply hole, and
wherein the supply passage is disposed at a position shifted from the positioning pin in an axial direction of the rotational shaft.

12. The bearing device according to claim 1,
wherein the circumferential groove is formed on an entire circumferential region of the internal peripheral surface of the housing hole including a circumferential position opposite to the positioning pin across the floating metal.

13. A turbocharger, comprising:
the bearing device according to claim 1;
the rotational shaft rotatably supported by the bearing device; and
a compressor impeller and a turbine impeller disposed on the rotational shaft.

* * * * *